Oct. 6, 1931.  R. L. CLAUSE  1,825,853
APPARATUS FOR MAKING PLATE GLASS
Filed Sept. 20, 1929  6 Sheets-Sheet 2
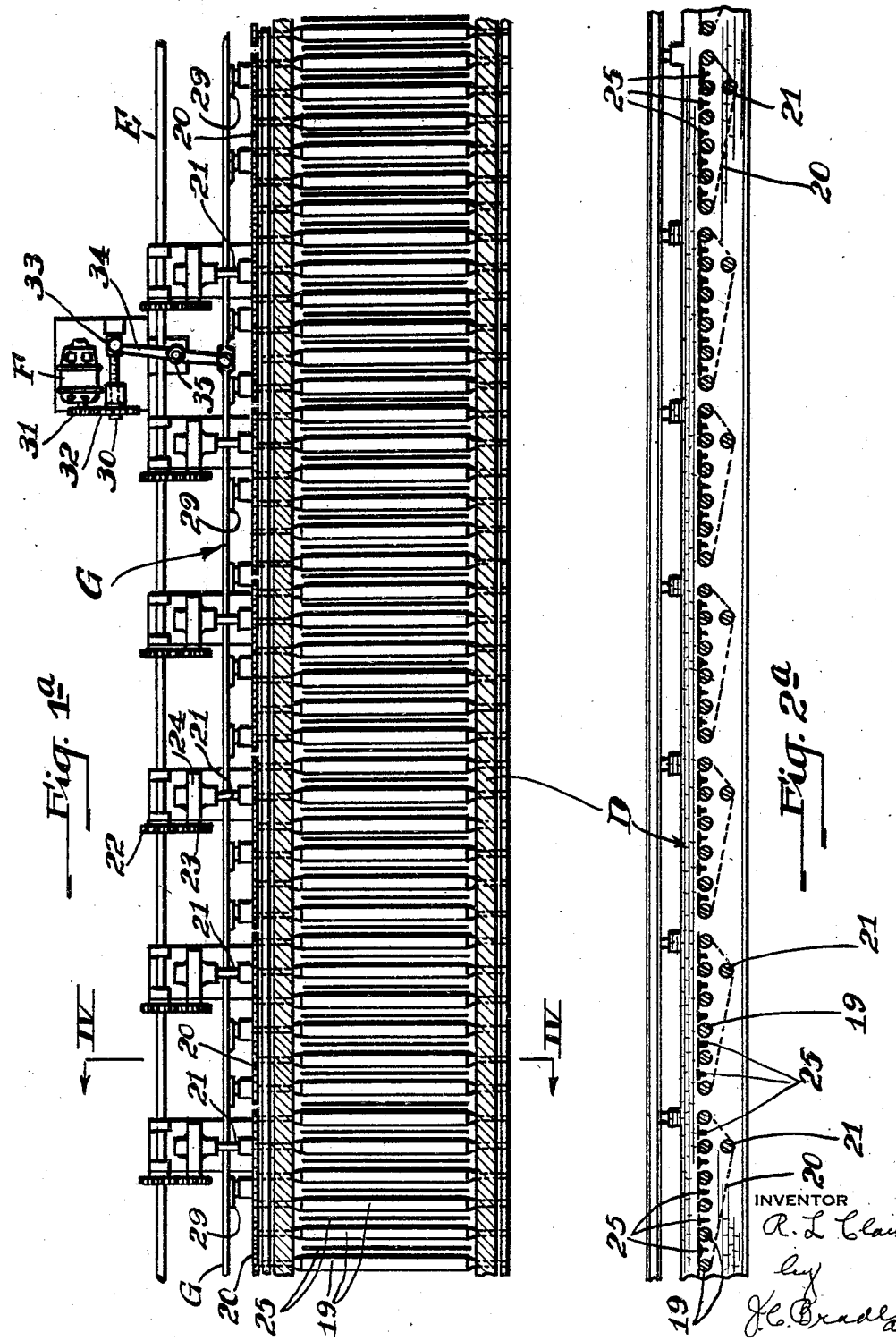

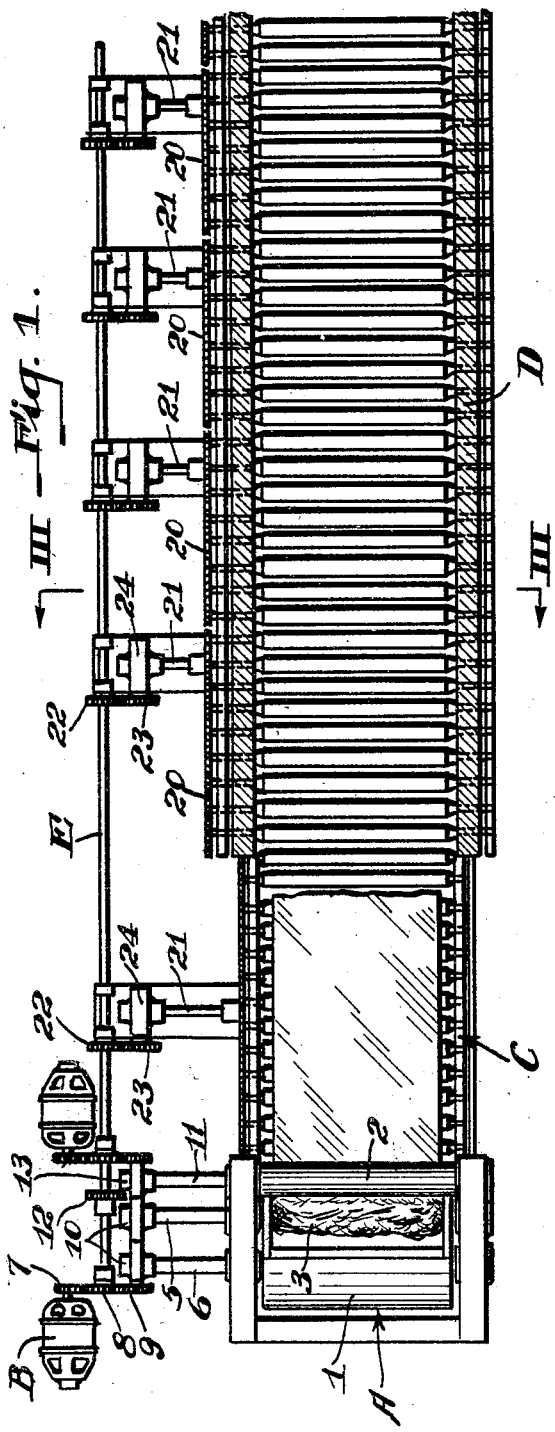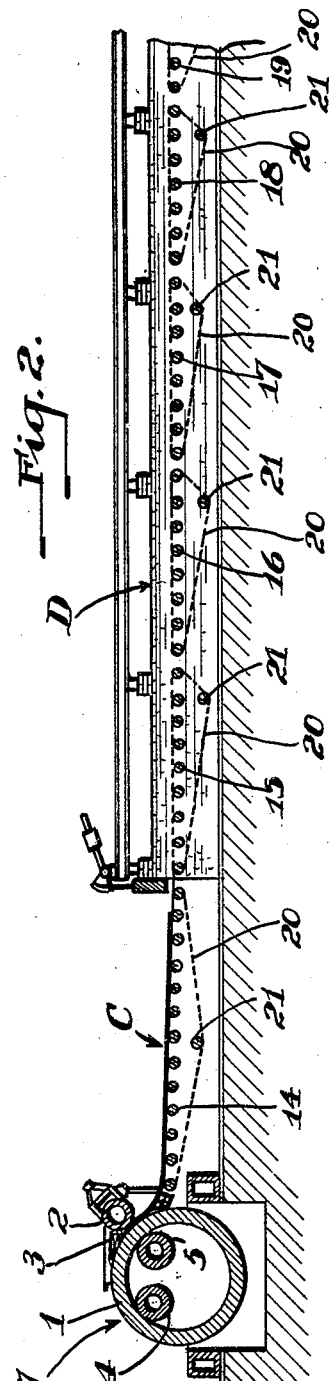

Oct. 6, 1931.  R. L. CLAUSE  1,825,853
APPARATUS FOR MAKING PLATE GLASS
Filed Sept. 20, 1929  6 Sheets-Sheet 3
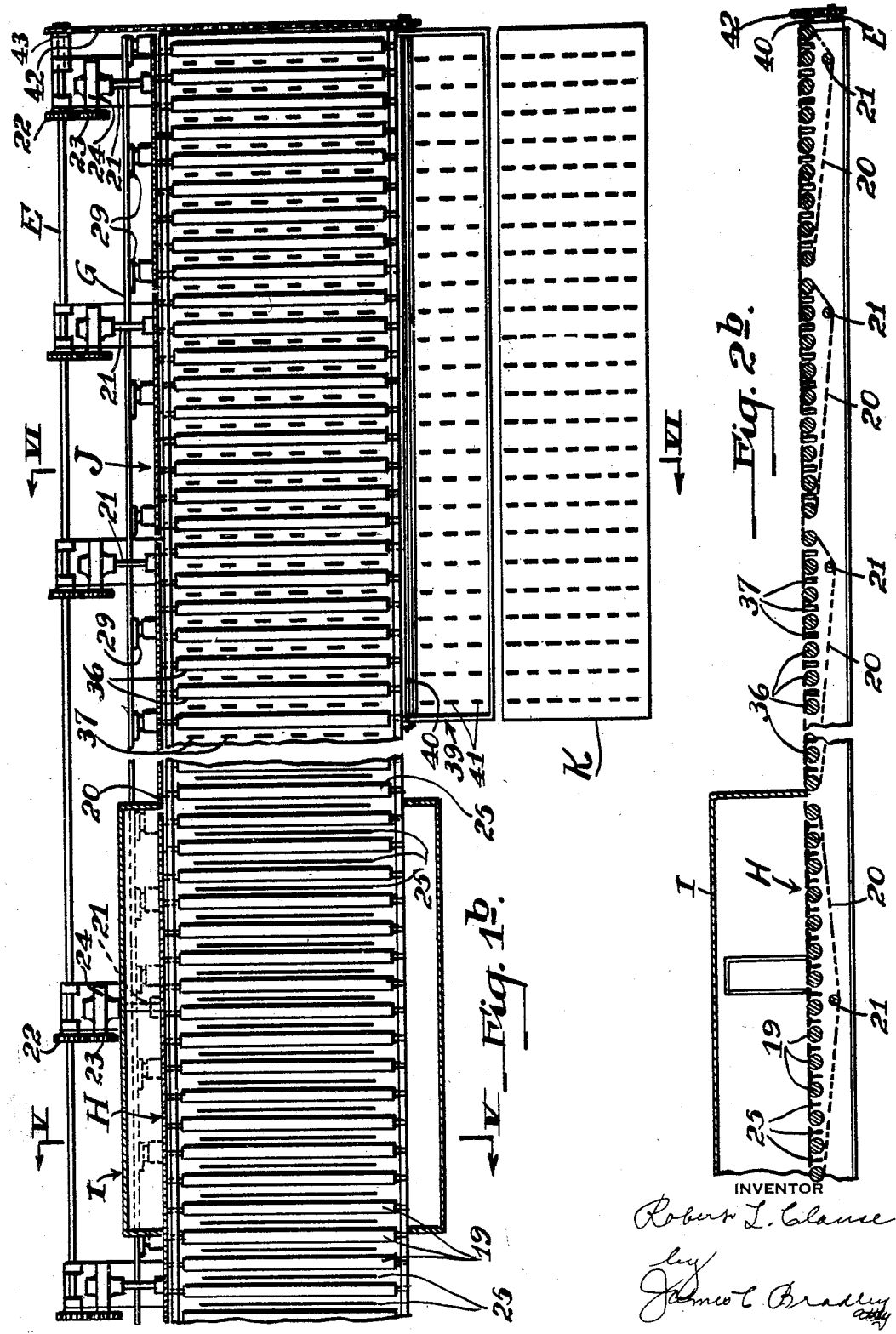
INVENTOR
Robert L. Clause
by James L. Bradley
atty Oct. 6, 1931.   R. L. CLAUSE   1,825,853

APPARATUS FOR MAKING PLATE GLASS

Filed Sept. 20, 1929   6 Sheets-Sheet 4

INVENTOR
Robert L. Clause
by
James L. Bradley
atty

Oct. 6, 1931.  R. L. CLAUSE  1,825,853
APPARATUS FOR MAKING PLATE GLASS
Filed Sept. 20, 1929  6 Sheets-Sheet 6
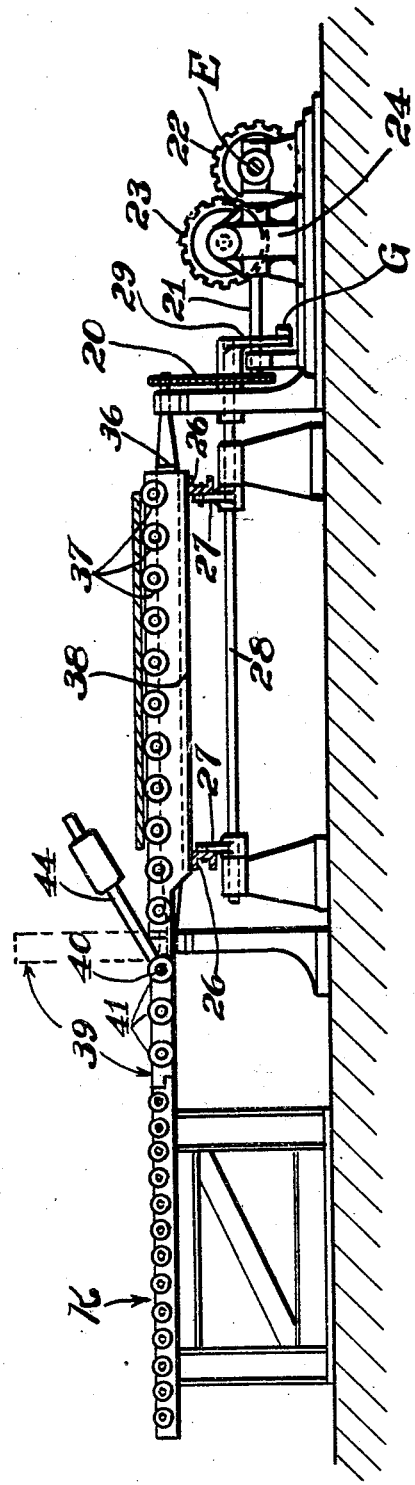
INVENTOR
Robert L Clause
by
James C Bradley
atty Patented Oct. 6, 1931

1,825,853

UNITED STATES PATENT OFFICE

ROBERT L. CLAUSE, OF SEWICKLEY, PENNSYLVANIA, ASSIGNOR TO PITTSBURGH PLATE GLASS COMPANY, A CORPORATION OF PENNSYLVANIA

APPARATUS FOR MAKING PLATE GLASS

Application filed September 20, 1929. Serial No. 394,034.

Figure 7:
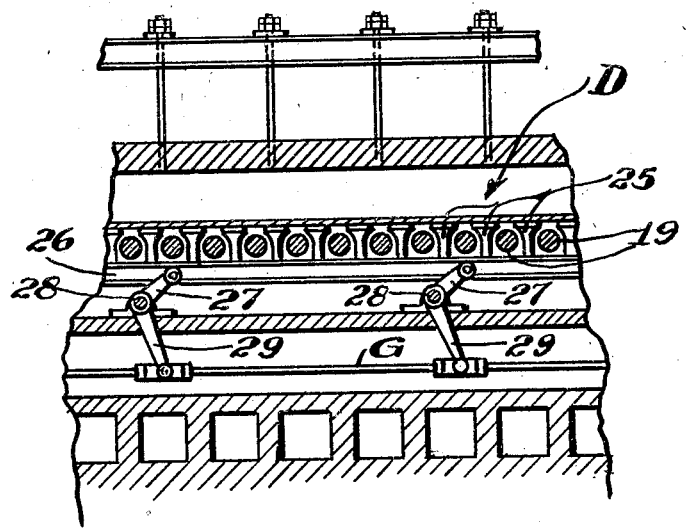

The invention relates to apparatus for making plate glass. It has for its object the provision of improved apparatus permitting the intermittent formation by a rolling operation, of sheets of glass at relatively high speed and the annealing of such sheets in a leer which is not unduly long. This is accomplished by providing means whereby the sheets in the roller leer employed are moved intermittently instead of continuously as has heretofore been the practice. The leer rolls are driven at the same peripheral speed as the sheet forming rolls, which is a very high speed for leer rolls, and would call for a leer of great length, if the rolls were operated continuously, but provision is made to stop the movement of the leer rolls between sheet forming operations, so that the sheets are moved through the leer in a series of steps, with periods of rest between the steps of greater length than the periods of movement. This permits the leer to be correspondingly reduced in length. In carrying out this intermittent leer movement, lifting bars are interspersed between the leer rolls, and after each rolling operation, the bars are moved upward to lift the glass sheets from the rolls and thus interrupt their progress through the leer, the bars being again lowered when the next sheet is rolled. One embodiment of the invention is illustrated in the accompanying drawings, wherein:

Figures 1, 1ª and 1ᵇ comprise a plan view partially in section of the complete apparatus. Figs. 2, 2ª and 2ᵇ comprise a longitudinal section through the apparatus of Fig. 1. Figs. 3, 4, 5 and 6 are transverse sections on the lines III—III, IV—IV, V—V, and VI—VI respectively of Figs. 1, 1ª and 1ᵇ. And Fig. 7 is a section on the line VII—VII of Fig. 4.

Figure 5:
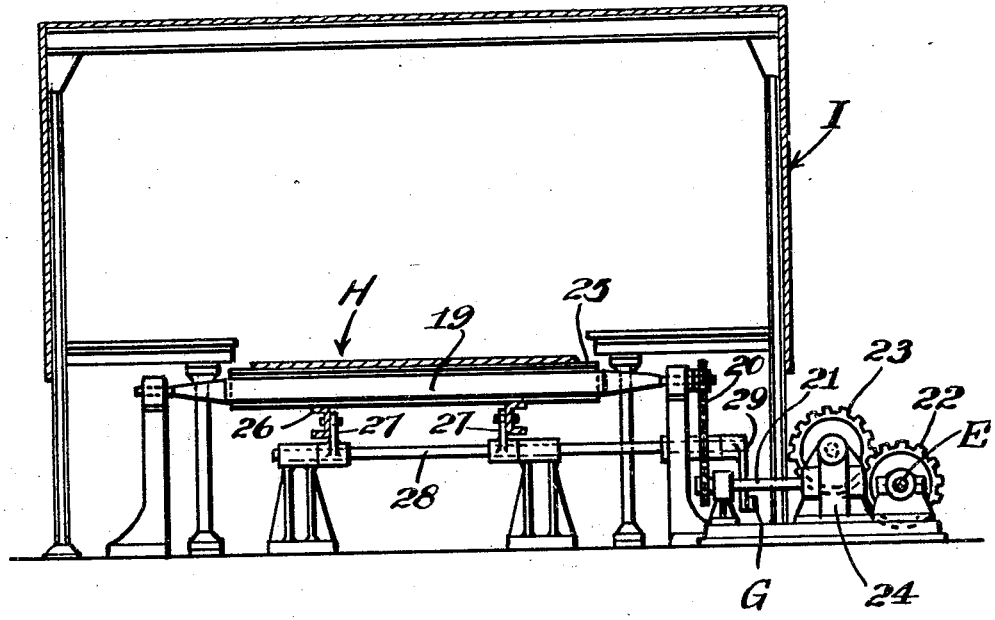

Referring to the drawings, A is the sheet forming or rolling apparatus driven from the motor B; C is a roller runway for conducting the glass sheet formed by the rolling apparatus into the leer; D is a roller leer in alignment with the sheet forming apparatus whose rolls are all driven from the drive shaft E extending longitudinally of the leer, which shaft is in turn driven from the motor B, F is an electric motor for operating the connecting rod G which raises and lowers the lifting bars which are interpersed between the rolls of the leer; H is the inspection table at the outlet end of the leer surrounded by a shed I (Fig. 5); J is a transfer table which receives the glass from the inspection table; and K is a roller cutting table located at the side of the table J to which the glass sheets are shifted after they arrive upon the table J.

The rolling apparatus comprises the ring roll 1 and the sizing roll 2 between which a body of glass 3 for forming a roll is poured from a pot (not shown). The roll 1 is rotated by the supporting rolls 4 and 5 having tumbler shafts 5 and 6 connected to their ends. These rolls are driven from the motor B through the intermediary of the gears 7, 8 and 9 and worm reduction gearing in the casings 10, 10. The sizing roll is suitably water cooled and is driven by the tumbler shaft 11 connected to its end. This tumbler shaft is driven from the shaft E through the intermediary of the gear 12 on the shaft E, a second gear (not shown) with which such gear meshes, and worm reduction gearing in the casing 13.

The sets of rolls 14, 15, 16, 17, 18, 19, etc. which constitute the roller bed of the runway C and the leer D are driven by chains 20, 20, 20, etc. passing around sprockets on the ends of the rolls and engaged by driving sprockets carried upon the transverse shafts 21, 21, 21, etc. These transverse shafts are all driven from the shaft E through reduction gearing made up in each case of a pair of spur gears 22, 23 and worm reduction gearing in the casing 24. This method of drive also applies to the rollers which constitute the bed of the inspection table H, and also the rolls which constitute the bed of the transfer table J, the gearing being such that all of these rolls are driven at substantially the same rate of peripheral speed as the forming or sizing rolls 1 and 2. The term "substantially" is used as the rolls constituting the various beds may be given a slightly higher speed than that of the forming or sizing rolls in order to impart a slight stretch to the sheet, this being a detail of operation well known in the art.

Figure 4:
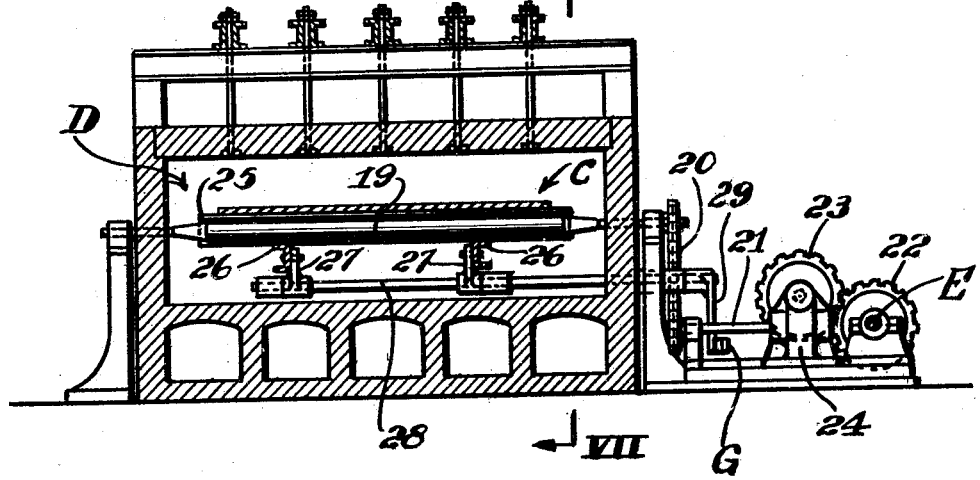
Figure 3:
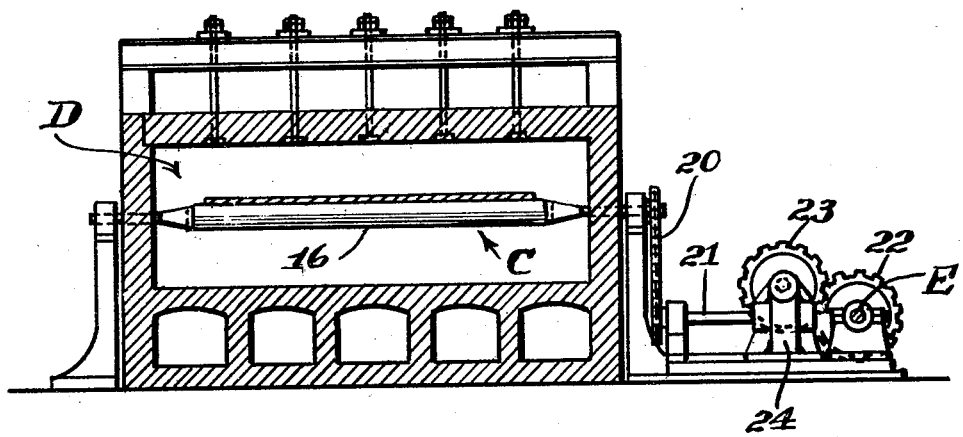

The major portion of the leer is provided with means for lifting the sheets from the rollers during the periods intervening between the successive forming or casting of sheets, such means preferably comprising the lifting bars 25 interspersed between the rolls. These transverse bars are supported at their ends upon longitudinally extending bars 26 (Figs. 4 and 7). The beams are supported for vertical movement upon a series of levers 27 keyed to the shafts 28. These shafts carry at their ends arms 29 by means of which the shafts 28 are oscillated to raise and lower the beams. Extending longitudinally of the leer is the connecting rod G for swinging the arms 29. This connecting rod is operated from the motor F which rotates the screw 30 through the gears 31 and 32. A nut 33 is mounted upon the screw and moved back and forth by the rotation thereof, such screw serving to swing the lever 34 which is pivoted at 35 and connected at its inner end to the connecting rod G. By this means all of the glass sheets in the leer are raised from the rolls during the period intervening between casting operations, such sheets being lowered and moved forward during each sheet forming operation. The sheets are thus moved through the leer in a series of steps with the periods of rest of greater length than during the periods in which the sheets are in motion. The upper edges of the bars are preferably provided with a covering of asbestos or other nonconducting material to prevent undue chilling of the sheet by the bars. The construction of the inspection table H is similar to that of the leer insofar as the support of the glass is concerned, the rollers alternating with the lifting bars 25 operated from the connecting rod G, as heretofore described.

The transfer table J is made up of rollers 36 which are driven from the leer drive shaft E in the same manner as the rolls forming the bed of the leer. Interspersed between these rollers 36 are the sets of rollers 37, each mounted upon a transverse bar 38 (Fig. 6). These bars are carried by longitudinally extending bars 26, 26 similar to those heretofore described in connection with the lifting bars 25, the levers and shafts for accomplishing this function being similarly numbered. The sheet of glass on the transfer table is, therefore, raised from the rolls 36 when the other sheets throughout the leer are raised, thus making it possible to move the sheet laterally in order to transfer it to the cutting table K. A roller apron 39 is provided between the table J and the table K, and to facilitate the movement of the sheet from the table over the apron, a driven shaft 40 is also provided having rollers 41, preferably with rubber tires, and this shaft is driven from a chain 42 passing around sprockets on the shafts E and 40, the sprocket on the shaft E being connected to such shaft by means of a magnetic clutch 43 to permit the driving of the shaft 40 at any desired intervals. The apron is preferably mounted for swinging movement, as indicated in Fig. 6, and is counterweighted by means of the lever 44. In the operation of the apparatus, a glass sheet is formed between the rollers 1 and 2 and moved along through the leer without interruption until it arrives over the first portion of the leer provided with the lifting bars 25. When the sheet arrives at this point, the connecting rod G is operated to move the bars to their upper position and thus lift the sheet from the rolls. The sheet remains in this position until the next casting operation so that when it is moved ahead through the leer, and the second sheet cast or formed takes the place of the first sheet. This operation continues until the first sheet cast arrives upon the transfer table J. Upon the next lifting movement of the bars this sheet is supported upon the rollers 37 and moved laterally onto the cutting table K, thus making room for the next sheet in the leer. The operation as thus described proceeds in a continuous cycle, the parts being so timed that a sheet is removed from the transfer table between the casting operations, a new sheet being added to the leer as each annealed and cooled sheet is removed therefrom.

What I claim is:

1. In apparatus for making sheets of glass, a roller leer, vertically movable lifting bars interspersed between the leer rolls and lying in raised position with their upper sides above the rolls and in lowered position having such sides below the tops of the rolls, an intermittent sheet rolling apparatus in alignment with the leer, and means for raising and lowering said bars.

2. In apparatus for making sheets of glass, a roller leer, vertically movable lifting bars interspersed between the leer rolls and lying in raised position with their upper sides above the rolls and in lowered position having such sides below the tops of the rolls, an intermittent sheet rolling apparatus for alignment with the leer, means for driving all of the leer rolls at substantially the same rate of peripheral speed as that of the rolls constituting the rolling apparatus and means for raising and lowering said bars.

3. In apparatus for making sheets of glass, a roller leer, vertically movable lifting bars interspersed between the leer rolls and lying in raised position with their upper sides above the rolls and in lowered position having such sides below the tops of the rolls, an intermittent sheet rolling apparatus in alignment with the leer, means for driving the leer rolls and the rolls comprising the rolling apparatus at substantially the same constant peripheral speed, and means for maintaining the bars in raised position intermediate the rolling operations.

In testimony whereof, I have hereunto subscribed my name this 13th day of September, 1929.

R. L. CLAUSE.